United States Patent [19]

Lamelot

[11] Patent Number: 5,458,298
[45] Date of Patent: Oct. 17, 1995

[54] DEVICE FOR OPTICALLY GUIDING AN AUTOROTATING MISSILE

[75] Inventor: Pierre L. M. Lamelot, Ville-d'Avray, France

[73] Assignee: Societe Anonyme de Telecommunications, Paris, France

[21] Appl. No.: 325,330

[22] Filed: Oct. 28, 1981

[30] Foreign Application Priority Data

Nov. 6, 1980 [FR] France .................................. 80 23709

[51] Int. Cl.⁶ ..................................................... F41G 7/26
[52] U.S. Cl. ............................................................. 244/3.16
[58] Field of Search ............................. 244/3.16; 102/213

[56] References Cited

U.S. PATENT DOCUMENTS 3,239,674  3/1966  Aroyan .................................. 244/3.16
3,642,233  2/1972  Bezerie .................................. 244/3.16
4,040,744  8/1977  Schertz et al. ........................ 244/3.16

*Primary Examiner*—Charles T. Jordan
*Assistant Examiner*—Christopher K. Montgomery
*Attorney, Agent, or Firm*—Stevens, Davis, Miller & Mosher

[57] ABSTRACT

An optical guidance device comprises an entry lens of which the optical axis merges with the axis of rotation of the missile, a filiform infrared detector, sensitive to the infrared radiation of a target, is placed in the focal plane of the lens. The detector is intersected at least twice by circles centered on the axis of rotation of the missile. A circuit elaborates deviation information from the output signals from the detector. Steering means are provided for correcting the path of the missile from the deviation information.

10 Claims, 3 Drawing Sheets

DEVICE FOR OPTICALLY GUIDING AN AUTOROTATING MISSILE

The present invention relates to a device for optically guiding an autorotating missile aimed at a target, adapted to prevent the axis of rotation of the missile from deviating from the missile-target direction.

French Patent No. 1 415 554 discloses a device for guiding an autorotating missile, comprising an entry lens placed at the front of the missile, a modulator placed in the focal plane of the lens and fast with the missile, a condenser and a detector sensitive to the infrared radiation emitted by the target, a circuit which elaborates deviation information from the output sisal from the detector and steering means for correcting the path of the missile from the deviation information.

It is an object of the present invention to provide a guiding device in which the autorotation of the missile is used, as in the known device, for ensuring analysis of the field, but which is particularly simplified with respect to this known device and, in particular, requiring neither a modulator nor a condenser.

The device according to the invention is characterised in that it comprises at least one filiform infrared detector placed in the focal plane of the entry lens, and designed to be intersected at least twice by circles centred on the axis of rotation of the missile.

In a particular embodiment of the device of the invention, the detector is formed by two sections of curves of equations $\rho = f(\theta)$ and $\rho = f'(\theta)$, respectively, $f(\theta)$ and $f'(\theta)$ being monotonic functions, i.e. always increasing or always decreasing.

The device of the invention preferably comprises two symmetrical detectors with respect to the axis of rotation of the missile and each comprising a section of Archimedes' spiral of which the pole is located on the axis of rotation, and which is extended, from this pole, by a half-line.

The invention will be more readily understood on reading the following description with reference to the accompanying drawings, in which:

FIG. 1 schematically shows the head of a shell provided with an infrared guiding device;

Figure 1:
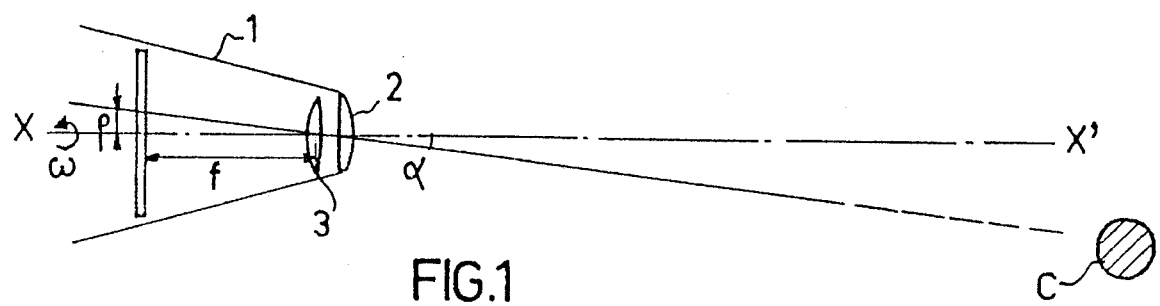

Referring now to the drawings, reference 1 in FIG. 1 denotes the head of a shell aimed at a target C and animated by a movement of rotation of velocity $\omega$ about its axis X-X'.

At the front of the shell is disposed a lens system transparent to the infrared radiation emitted by the target and of which the optical axis merges with axis X-X', comprising an entry lens 2 constituting the tip of the shell and a focusing lens 3. In the focal plane of the lens 3 are placed infrared detectors sensitive to the radiation emitted by the target. If it is desired that the detectors be sensitive to the infrared radiation emitted by engine gases, InSb detectors may advantageously be used, provided with a coding device using liquid nitrogen, sensitive in the range 4.4–4.7 μm.

Let us assume that the axis X-X' of the shell makes an angle $\alpha$ with the direction shell-target.

Due to the autorotation, the image of the target in the focal plane of the lens describes a circle centred on the axis X-X' and of radius $\rho = f \cdot \mathrm{tg}\,\alpha$, f being the focal distance of the lens.

As the angle $\alpha$ is always small, in practice $\rho = f \cdot \alpha$. Knowledge of radius $\rho$ is therefore equivalent to knowledge of the deviation $\alpha$. This deviation $\alpha$ or preferably its derivative $d\alpha/dt$ with respect to time is determined with the aid of the detectors and the circuit described hereinafter.

Figure 2:
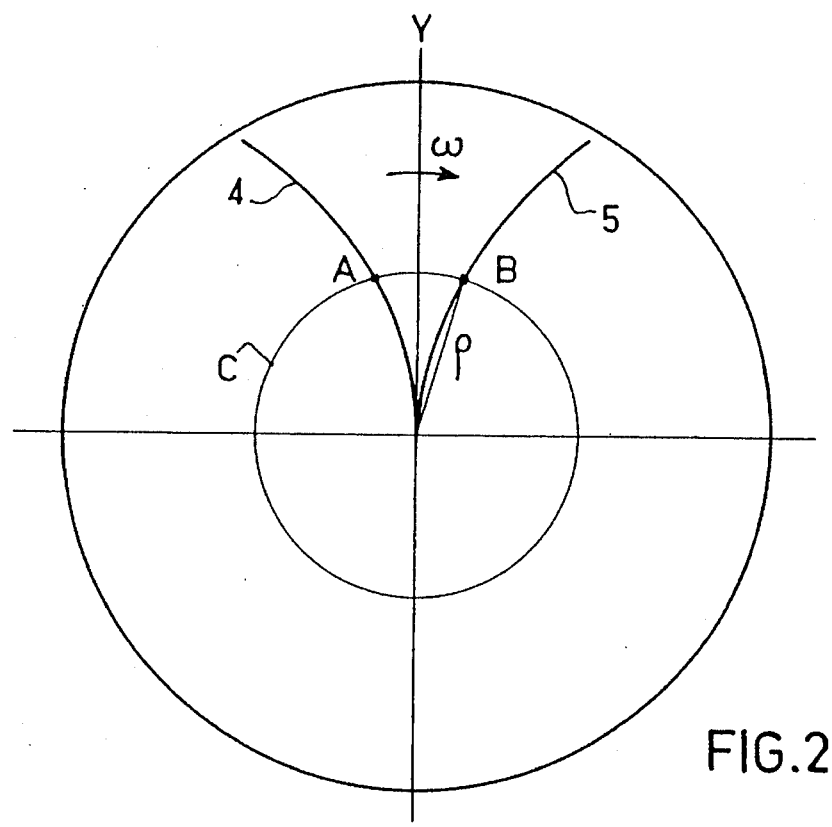
FIG. 2 shows the form of the infrared detector in a first embodiment.

FIG. 2 shows a first embodiment of the detector.

A filiform detector is provided, formed by two sections of Archimedes' spiral 4 and 5 which are symmetrical with respect to a plane Y passing through axis X-X'. The section 4 has the form of a spiral of equation $\rho = k\,\theta$ and the detector section 5 has the form of a spiral of equation $\rho = -k\,\theta$, these two spirals of equation $k|\theta|$, having the same pole, located on the axis X-X', and extending up to this pole.

The circle C of radius $\rho$ described by the image of the target in the plane of the detector intersects the section 4 at A and section 5 at B. Upon each revolution of order n of the shell, the detector sections 4 and 5 each produce an electric pulse $I_A$, $I_B$ at respective instants $t_A$ and $t_B$ separated by a time $\tau$, and a time T separates the emission by the same section 4 of two consecutive pulses.

Under these conditions, it is clear that the deviation angle $\alpha$ may be deduced from $\tau$ and T by the relation $$\alpha = \frac{k}{f}\,\pi\,\frac{\tau}{T}$$

The derivative of the deviation $\alpha$ is then $$\frac{\Delta\alpha}{\Delta t} = \frac{k}{f}\,\pi\,\frac{\tau_{n+1} - \tau_n}{T_n^2},$$

the indices n, n+1 relating to the revolution during which the pulses are produced.

It is this magnitude which is used for path correction, preferably at angle $\alpha$.

Figure 3:
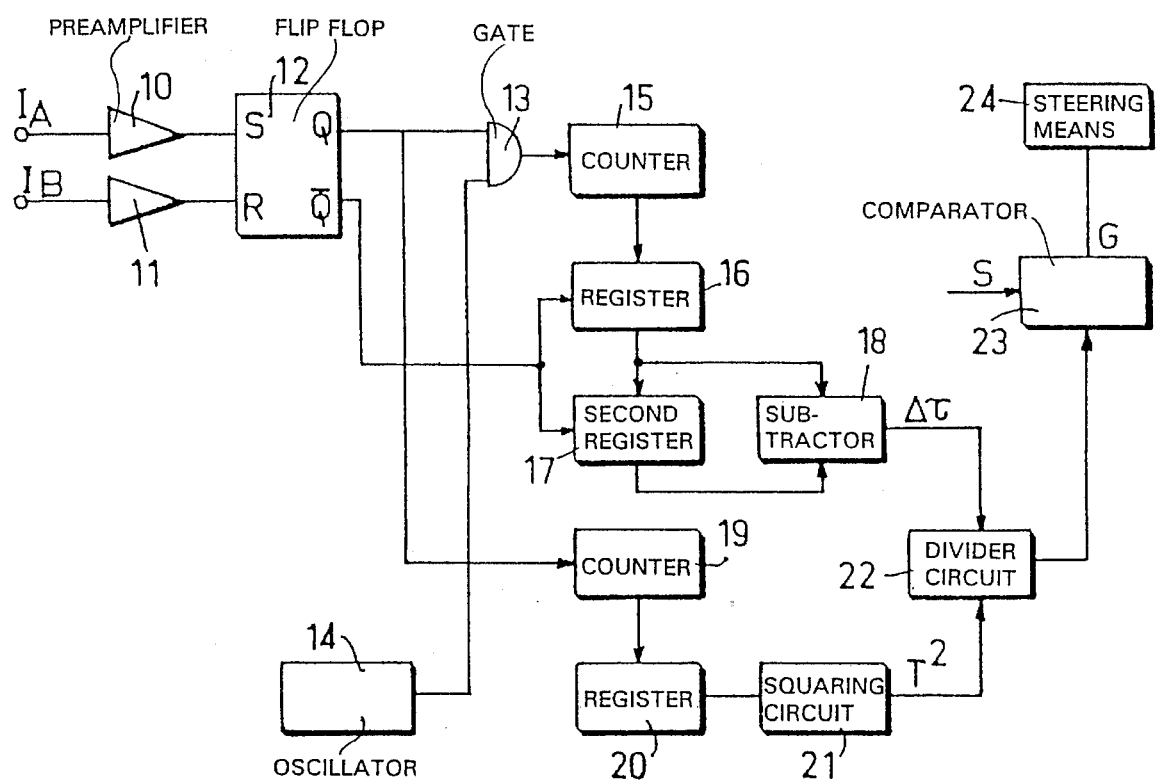
FIG. 3 is a diagram of the circuit associated with the detector of FIG. 2.

The circuit shown in FIG. 3 enables the derivative $$\frac{\Delta\alpha}{\Delta t}$$

to be determined.

Figure 4:
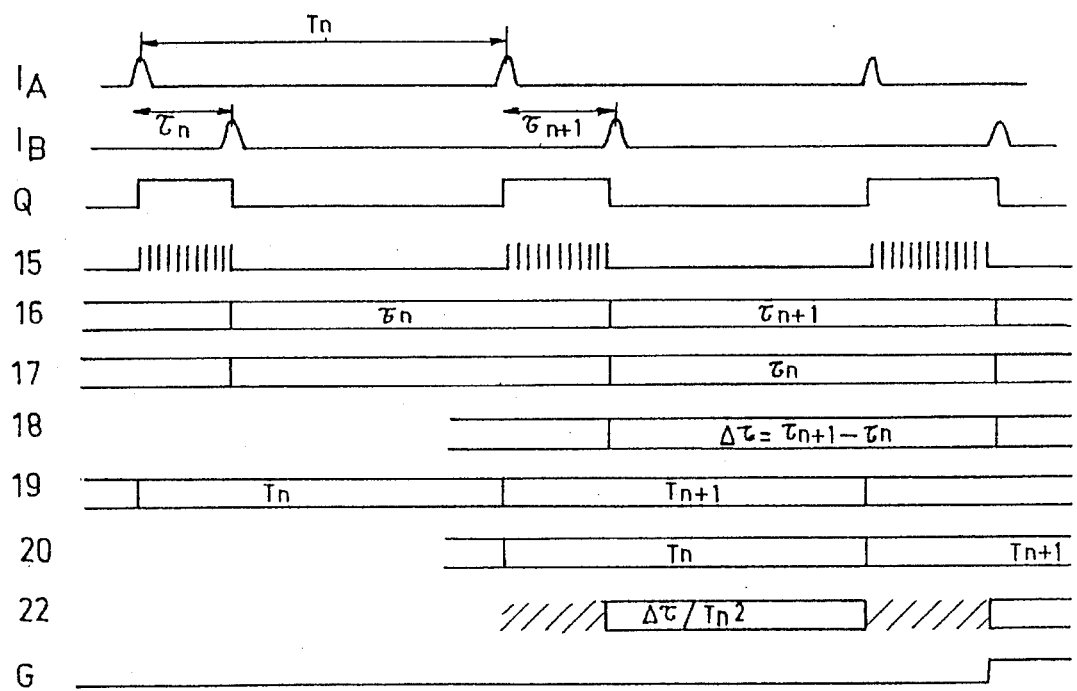
FIG. 4 is a timing chart corresponding to the diagram of FIG. 3.

The signals $I_A$, $I_B$ issuing from the detector sections 4 and 5, after passage in preamplifiers 10, 11, are applied to the inputs R and S of a flip flop 12. The output Q of the flip flop 12 is therefore at level 1 during the time $\tau_n$ separating the pulses applied to the flip flop as shown by the chart of FIG. 4. The output Q is connected to an AND gate 13 receiving clock signals from an oscillator 14 and of which the output is connected to a counter 15.

The counter 15 is returned to zero by the pulse $I_B$, which controls, at the same time, the recording in a register 16 of the contents $\tau_n$ of the counter 15.

The register 16 is, to this end, controlled by the output signal $\overline{Q}$ from the flip flop 12.

Upon the pulse $I_B$ of the following revolution of order n+1, the contents $\tau_n$ of the register 16 is transferred in a second register 17, also controlled by the above-mentioned signal $\overline{Q}$. On the other hand, a subtractor 18 receives the contents $\tau_n$ of the second register 17 and the contents $\tau_{n+1}$ of the first register 16. The subtractor 18 consequently delivers a signal representing the difference $\Delta\tau = \tau_{n+1} - \tau_n$.

The measurement of $T_n$ is effected in the same manner by means of a counter 19 receiving the output signal Q from the flip flop and of which the contents are transferred in a register 20 at the moment of the pulse $I_A$ at the same time as it is returned to zero.

The output signal from register 20 is squared in a circuit 21 and the signal representative of $T_n^2$ is applied to a divider circuit 22 which receives the signal issuing from the subtractor 18.

The divider circuit 22 therefore delivers a signal representative of the expression $(\tau_{n+1}-\tau_n)/T_n^2$, i.e. of the derivative $\Delta\alpha/\Delta t$.

This signal is compared with a threshold S in a comparator 23 and a guiding pulse G is delivered by the comparator, if the derivative signal is greater than the threshold, and applied to means for steering the shell, symbolised by the block 24, with a view to correcting the path thereof.

The moment at which the pulse G is applied to the steering means corresponds to the moment when the image of the target passes through plane Y, plane of symmetry of the detector sections 4 and 5. This moment $t_G$ is obtained by calculating the mean $$t_G = \frac{t_A + t_B}{2},$$

this value having to be determined for each revolution.

An appropriate circuit (not shown) is provided for calculating $t_G$. Such a circuit is within the scope of the man skilled in the art and it is unnecessary to describe it in detail here.

Figure 5:
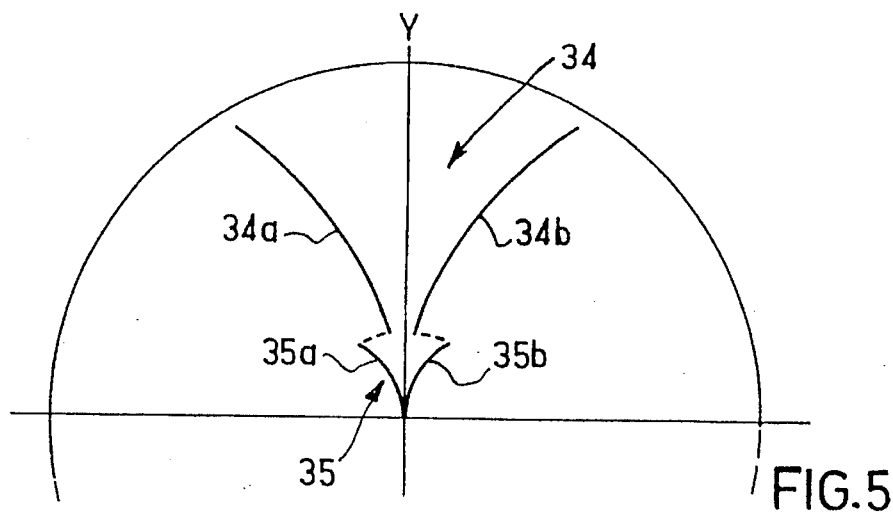
FIG. 5 shows a variant with respect to the embodiment of FIG. 2.

FIG. 5 shows a variant embodiment which procures an improved precision for small deviations, and which comprises two detectors 34 and 35. Each of the detectors is composed of two sections of Archimedes' spiral 34a, 34b and 35a, 35b, having a common pole located on the axis of rotation of the missile, only sections 35a and 35b of the detector 35 extending up to this pole.

The peripheral sections 34a, 34b are identical to the sections of detector 4 and 5 of FIG. 5 and correspond to a target acquisition phase. The central sections 35a, 35b serving for tracking respond to equations $\rho=k'\theta$ and $\rho=-k'\theta$, the coefficient k' being clearly smaller than the above-mentioned coefficient k of the sections of detector 34a, 34b (or 4,5), so that, for a given deviation, i.e. for a given radius, the arc 2θ defined by A and B is much greater. In the embodiment shown, k' has been chosen to be equal to k/4. In this case, it suffices to incorporate in the circuit of FIG. 3 an additional conventional multiplier device, as well as a switch so that, upon passage from detector 34 to detector 35, the ratio $$\frac{\tau_{n+1} - \tau_n}{T_n^2}$$

is multiplied, at the output of the divider circuit 22, by $$\frac{k'\pi}{f}$$

and no longer by $$\frac{k\pi}{f}.$$

Figure 6:
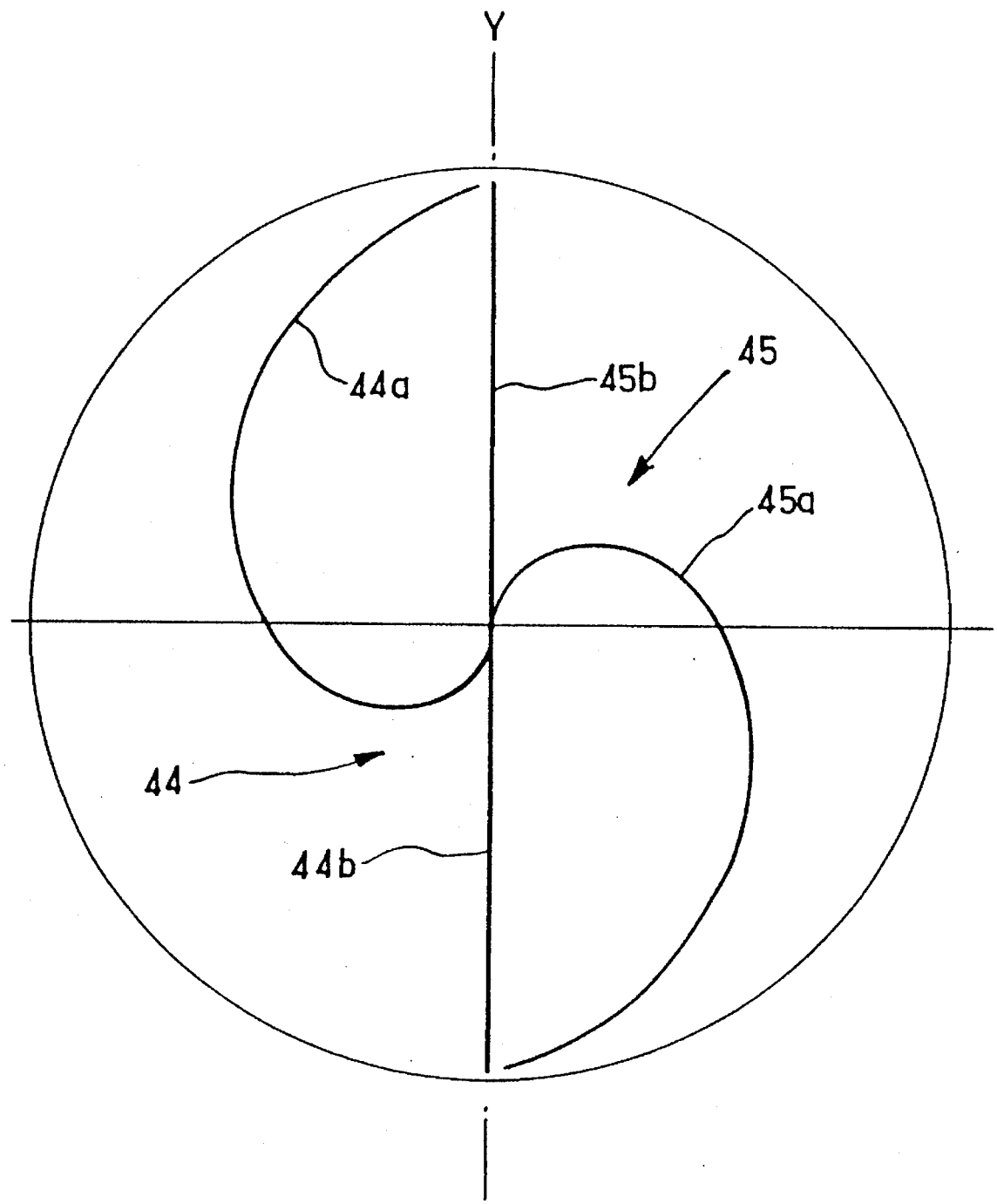
FIG. 6 shows another embodiment of the infrared detectors.

FIG. 6 shows an embodiment in which two detectors 44,45 are provided, which are symmetrical with respect to the axis of rotation of the missile and each comprising a section of Archimedes' spiral 44a, 45a, of which the pole is located on the axis of rotation, and which is extended, from this pole, by a half line 44b, 45b extending in the plane of symmetry Y, defined hereinabove, of the spirals 44a, 45a, preferably, as shown, towards the first arc of 180° of the corresponding section of spiral. One of the two detectors results from the other by rotation of 180° about the axis of rotation. At each revolution, the two detectors each produce a pair of pulses relative respectively to the spiral section 45a, 44a and to the half line 45b, 44b. Thus, the rate of information is doubled and consequently precision is improved. The circuit of FIG. 3 remains appropriate for exploiting the information furnished by the detectors of FIG. 6, on condition that a pair of additional preamplifiers be incorporated, the four preamplifiers then being connected in two's, in parallel, on the two inputs of the flip flop 12.

What is claimed is:

1. Device for optically guiding an autorotating missile aimed at a target, characterized in that it comprises an entry lens placed at the front of the missile of which the optical axis merges with the axis of rotation of the missile, at least one filiform infrared detector sensitive to the infrared radiation of the target, placed in the focal plane of the lens, said detector being designed to be intersected at least twice by circles centred on the axis of rotation of the missile, a circuit elaborating deviation information from the output signals from the detector, and steering means for correcting the path of the missile from this deviation information.

2. The device of claim 1, wherein the detector comprises two sections of curves of respective equations $\rho=f(\theta)$ and $\rho=f'(\theta)$, $f(\theta)$ and $f'(\theta)$ being monotonic functions.

3. The device of claim 2, wherein one of said sections is a section of Archimedes' spiral.

4. The device of claim 3, wherein the other of said sections is a section of Archimedes' spiral.

5. The device of claim 4, wherein the two sections of Archimedes' spirals extend up to their common pole, located on the axis of rotation of the missile.

6. The device of claim 3, wherein the other of said sections is a half line.

7. The device of claim 6, wherein the section of Archimedes' spiral and the half line both extend up to the pole of the section of Archimedes' spiral, located on the axis of rotation of the missile.

8. The device of claim 7, wherein two detectors are provided, which are symmetrical with respect to the axis of rotation of the missile and each comprising a section of Archimedes' spiral of which the pole is located on the axis of rotation of the missile, and which is extended, from this pole, by a half line.

9. The device of claim 8, wherein each half line tends the corresponding section of spiral towards the first arc of 180° of this spiral.

10. The device of one of claims 4 and 5, wherein a peripheral detector is provided, comprising two sections of Archimedes' spirals of equations $\rho=k|(\theta)|$ and a central detector comprising two sections of Archimedes' spirals extending up to their common pole, located on the axis of rotation of the missile, of equations $\rho=k'|(\theta)|$ with k'<k.

* * * * *